(12) United States Patent
Helsper et al.

(10) Patent No.: US 8,032,594 B2
(45) Date of Patent: Oct. 4, 2011

(54) EMAIL ANTI-PHISHING INSPECTOR

(75) Inventors: David Helsper, Marietta, GA (US); Jeff Burdette, Norcross, GA (US); Robert Friedman, Decatur, GA (US)

(73) Assignee: Digital Envoy, Inc., Norcross, GA (US)

( * ) Notice: Subject to any disclaimer, the term of this patent is extended or adjusted under 35 U.S.C. 154(b) by 1573 days.

(21) Appl. No.: 10/985,664

(22) Filed: Nov. 10, 2004

(65) Prior Publication Data

US 2006/0101120 A1    May 11, 2006

(51) Int. Cl.
*G06F 15/16* (2006.01)
*G06F 12/00* (2006.01)

(52) U.S. Cl. ........................................ 709/206; 709/207

(58) Field of Classification Search .................. 709/229, 709/203, 206–207; 726/22, 23, 25
See application file for complete search history.

(56) References Cited

U.S. PATENT DOCUMENTS

| | | | |
|---|---|---|---|
| 4,939,726 A | 7/1990 | Flammer et al. | |
| 5,042,032 A | 8/1991 | Dighe et al. | |
| 5,115,433 A | 5/1992 | Baran et al. | |
| 5,488,608 A | 1/1996 | Flammer et al. | |
| 5,490,252 A | 2/1996 | Macera et al. | |
| 5,862,339 A | 1/1999 | Bonnaure et al. | |
| 5,878,126 A | 3/1999 | Velamuri et al. | |
| 5,948,061 A | 9/1999 | Merriman et al. | |
| 6,012,088 A | 1/2000 | Li et al. | |
| 6,035,332 A | 3/2000 | Ingrassia, Jr. et al. | |
| 6,130,890 A | 10/2000 | Leinwand et al. | |
| 6,151,631 A | 11/2000 | Ansell et al. | |
| 6,185,598 B1 | 2/2001 | Farber et al. | |
| 6,275,470 B1 | 8/2001 | Ricciuli | |
| 6,338,082 B1 | 1/2002 | Schneider | |
| 6,421,726 B1 | 7/2002 | Kenner et al. | |
| 6,425,000 B1 | 7/2002 | Carmello et al. | |
| 6,526,450 B1 | 2/2003 | Zhang et al. | |
| 2004/0068542 A1 | 4/2004 | Lalonde et al. | 709/206 |
| 2004/0123157 A1 | 6/2004 | Alagna et al. | 713/201 |
| 2004/0148330 A1* | 7/2004 | Alspector et al. | 709/200 |
| 2004/0267886 A1* | 12/2004 | Malik | 709/206 |
| 2005/0022008 A1* | 1/2005 | Goodman et al. | 713/201 |

(Continued)

FOREIGN PATENT DOCUMENTS

EP    1 482 696    12/2004

(Continued)

OTHER PUBLICATIONS

Hinde, S. on Spam, Scams, chains, hoaxes and other junk mail, ISBN 0167-4048/02, 2002, Elsevier Science Ltd, p. 592-606.*

(Continued)

*Primary Examiner* — Zarni Maung
(74) *Attorney, Agent, or Firm* — Ballard Spahr LLP

(57) ABSTRACT

An application and system for inspecting an email message to determine if the email message is being used in a phishing ploy. When an email recipient receives an email message, the email message is sent to an EScam server for inspection. During its inspection, the EScam server considers various criteria, such as an originating country for an IP address associated with a sender of the email message, and assigns a score to the email message. Based on the score of the email message and threshold levels set within the EScam server, an email client determines whether the email message is part of a phishing ploy or a legitimate email message.

31 Claims, 2 Drawing Sheets

U.S. PATENT DOCUMENTS

| | | | |
|---|---|---|---|
| 2005/0169274 A1* | 8/2005 | Shuster | 370/392 |
| 2005/0193072 A1 | 9/2005 | Chant et al. | 709/206 |
| 2005/0257261 A1* | 11/2005 | Shraim et al. | 726/22 |
| 2006/0031306 A1* | 2/2006 | Haverkos | 709/206 |

FOREIGN PATENT DOCUMENTS

| | | |
|---|---|---|
| WO | WO 99/34305 | 7/1999 |
| WO | WO 2006/053142 | 5/2006 |

OTHER PUBLICATIONS

Chou, N., Ledesma, R., Teraguchi, Y., and Mitchell, J. C. Feb 2004. Client-Side Defense Against Web-Based Identity Theft. 11th Annual Network and Distributed System Security Symposium (NDSS '04), San Diego, CA.*

U.S. Appl. No. 60/194,761, filed Apr. 3, 2000, Christopher Herringshaw, et al., Inventor.

U.S. Appl. No. 60/241,776, filed Oct. 18, 2000, Brad Doctor, et al., Inventor.

*Content Delivery Services: Footprint Streaming Solutions,* Brochure from Digital Island.

*TraceWire White Paper,* Brochure from Digital Island, Jun. 1999.

*We Know Where You Live,* Scott Woolley, Forbes Magazine, Nov. 13, 2000.

*Nicname/Whois,* Internet Engineering Task Force, Request for Comments 954.

*A Primer on Internet and TCT/IP Tools and Utilities,* Internet Engineering Task Force, Request for Comments 2151.

*Domain Name System Security Extensions,* Internet Engineering Task Force, Request for Comments 2535.

Supplementary European Search Report and Written Opinion for PCT/US2006/046665 Dated Dec. 18, 2008.

Supplementary European Search Report and Written Opinion for PCT/US2005/040775 Dated Dec. 19, 2008.

Tally, G. et al., "Anti-Physhing—Best Practices for Institutions and Consumers," Internet Citation, Sep. 1, 2004.

Anti-Phishing Working Group: "Phishing Activity Trends Report," Internet Citation, Oct. 1, 2004.

* cited by examiner

EMAIL ANTI-PHISHING INSPECTOR

BACKGROUND OF THE INVENTION

1. Field of the Invention

The present invention relates to a technique for detecting email messages used for defrauding an individual (such as so-called "phishing" emails). The present invention provides a method, system and computer program for operating an EScam server that is capable of accepting an email message and determining whether the email message is a phishing email message.

2. Description of the Related Art

Phishing is a scam where a perpetrator sends out legitimate looking emails appearing to come from some of the World Wide Web's biggest and most reliable web sites for example—eBay, PayPal, MSN, Yahoo, CitiBank, and America Online—in an effort to "phish" for personal and financial information from an email recipient. Once the perpetrator obtains such information from the unsuspecting email recipient, the perpetrator subsequently uses the information for personal gain.

There are a large number of vendors today providing anti-phishing solutions. In all but a few cases, these solutions do not help to manage phishing emails proactively. Instead, they rely on providing early warnings based on known phishing emails, black lists, stolen brands, etc.

Currently, anti-phishing solutions fall into three major categories:

1) Link Checking Systems use black lists or behavioral technologies that are browser based to determine whether a site is linked to a spoofed site. Unfortunately, systems using black list solutions are purely reactive solutions that rely on third party updates of IP addresses that are hosting spoofed sites.
2) Early Warning Systems use surveillance of phishing emails via "honey pots"(a computer system on the Internet that is expressly set up to attract and 'trap' people who attempt to penetrate other people's computer systems), online brand management and scanning, Web server log analysis, and traffic capture and analysis technologies to identify phishing emails. These systems will identify phishing attacks quickly so that member institutions can get early warnings. However, none of these systems is proactive in nature. Therefore, these systems fail to protect a user from being victimized by a spoofed site.
3) Authentication and Certification Systems use trusted images embedded in emails, digital signatures, validation of an email origin, etc. This allows the customer to determine whether or not an email is legitimate.

Current anti-phishing solutions fail to address phishing attacks in real time. Businesses using a link checking system must rely on a black list being constantly updated for protection against phishing attacks. Unfortunately, because the link checking system is not a proactive solution and must rely on a black list update, there is a likelihood that several customers will be phished for personal and financial information before an IP address associated with the phishing attack is added to the black list. Early warning systems attempt to trap prospective criminals and shut down phishing attacks before they happen; however, they often fail to accomplish these goals because their techniques fail to address phishing attacks that do not utilize scanning. Authentication and certification systems are required to use a variety of identification techniques; for example, shared images between a customer and a service provider which are secret between the two, digital signatures, code specific to a particular customer being stored on the customer's computer. Such techniques are intrusive in that software must be maintained on the customer's computer and periodically updated by the customer.

Accordingly, there is a need and desire for an anti-phishing solution that proactively stops phishing attacks at a point of attack and is non-intrusive.

SUMMARY OF THE INVENTION

The present invention provides a method and system for determining whether an email message is being used in a phishing attack in real time. In an exemplary embodiment, when an end user receives an email message, the email message is analyzed by a server to determine if the email message is a phishing email. The server parses the email message to obtain information which is used in an algorithm to create a phishing score. If the phishing score exceeds a score threshold, the email is determined to be a phishing email message.

BRIEF DESCRIPTION OF THE DRAWINGS

The foregoing and other advantages and features of the invention will become more apparent from the detailed description of exemplary embodiments of the invention given below with reference to the accompanying drawing.

DETAILED DESCRIPTION OF THE INVENTION

In the following detailed description, reference is made to the accompanying drawings, which form a part hereof, and which is shown by way of illustration of specific embodiments in which the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention.

The term "EScam Score" refers to a combination of values that include a Header Score and a Uniform Resource Locator (URL) Score. The EScam score represents how suspicious a particular email message may be.

The term "Header Score" refers to a combination of values associated with an internet protocol (IP) address found in an email message being analyzed.

The term "URL score" refers to a combination of values associated with a URL found in an email message being analyzed.

The term "Non-Trusted Country" refers to a country that is designated by an EScam server as a country not to be trusted, but is not a high-risk country or an Office of Foreign Assets Control (OFAC) country (defined below).

The term "High Risk Country" refers to a country that is designated by the EScam server as a country that has higher than normal crime activity, but is not an OFAC country.

The term "Trusted Country" refers to a country that is designated by the EScam server as a country to be trusted.

The term "OFAC Country" refers to a country having sanctions imposed upon it by the United States or another country.

The term "EScam message" refers to a text field provided by the EScam server describing the results of the EScam server's analysis of an email message.

The term "EScam Data" refers to a portion of an EScam server report detailing all IP addresses in the email Header and all URLs within the body of the email message.

The operation of a NetAcuity server 240 which may be used in the present invention is discussed in U.S. patent application Ser. No. 09/832,959, which is commonly assigned to the assignee of the present application, and which is herein incorporated by reference in its entirety.

Figure 1:
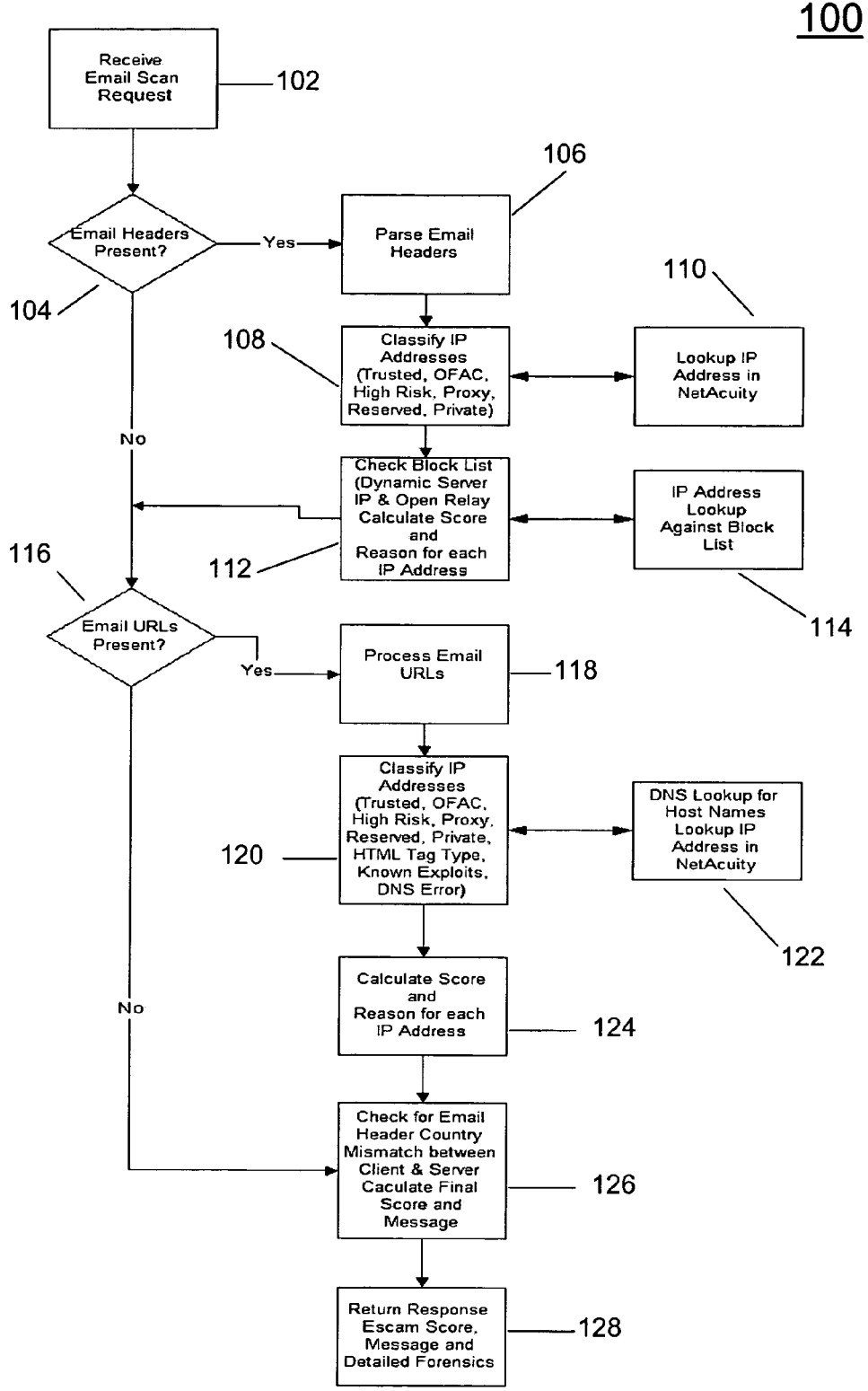
FIG. 1 is a flow chart illustrating a method for determining whether an email message is a phishing email in accordance with the present invention.

FIG. 1 is a flow chart illustrating steps for determining whether an email message is a phishing email in accordance with the present invention. At step 102, when EScam server 202 receives a request to scan an email message, the EScam server 202 initiates processing of the email message. Next at step 104, the EScam server 202 determines if any email headers are present in the email message. If email headers are not present in the email message, the EScam server 202 proceeds to step 116. If email headers are present in the email message, at step 106, the EScam server 202 parses the email headers from the email message to obtain IP addresses from the header. Next at step 108, the EScam server 202 determines how the IP addresses associated with the header should be classified for subsequent scoring. For example, classifications and scoring for the IP addresses associated with the header could be the following:

| Header Attribute | Score |
| --- | --- |
| Reserved Address | 5 |
| High Risk Country | 4 |
| OFAC Country | 4 |
| Non-Trusted Country | 3 |
| Anonymous proxy (email header only) | 4 |
| Open Relay | 4 |
| For multiple countries found in the header | 1 (Each unique country adds a point) |
| Dynamic Server IP address | 1 |

Once the IP address has been classified at step 108, the EScam server 202 transfers the IP address to a NetAcuity server 240 to determine a geographic location of the IP address associated with the email header, at step 110. The NetAcuity server 240 may also determine if the IP address is associated with an anonymous proxy server. Next at step 112, the IP address is checked against a block list to determine if the IP address is an open relay server or a dynamic server. The determination in step 112 occurs by transferring the IP address to, for example, a third party for comparisons with a stored block list (step 114). In addition, at step 112, the EScam server 202 calculates a Header score.

Subsequent to step 114, all obtained information is sent to EScam server 202. Next, at step 116, EScam server 202 determines if any URLs are present in the email message. If no URLs are present in the email message, the EScam server 202 proceeds to step 126. If a URL is present, the EScam server 202 processes the URL at step 118 using an EScam API 250 to extract host names from the body of the email message. Next at step 120, the EScam server 202 determines how the IP address associated with the URL should be classified for subsequent scoring by examining Hypertext Markup Language (HTML) tag information associated with the IP address. For example, classifications and scoring for the IP address associated with the URL could be the following:

| URL Attribute | Score |
| --- | --- |
| Map | 5 |
| Form | 5 |
| Link | 4 |
| Image | 2 |

Once the IP address has been classified, at step 120, the EScam server 202 transfers the IP address to the NetAcuity server 240 to determine a geographic location of the IP address associated with the URL (step 122). Next, at step 124, the EScam server 202 calculates a score for each IP address associated with the email message and generates a combined URL score and a reason code for each IP address. The reason code relates to a reason why a particular IP address received its score. For example, the EScam server 202 may return a reason code indicating that an email is determined to be suspect because the IP address of the email message originated from an OFAC country and the body of the email message contains a link that has a hard coded IP address.

At step 126, EScam server 202 compares a country code from an email server associated with the email message header and a country code from an email client to ensure that the two codes match. The EScam server 202 obtains country code information concerning the email server and email client using the NetAcuity server 240, which determines the location of the email server and client server and returns a code associated with a particular country for the email server and email client. If there is a mismatch between the country code of the email server and the country code of the email client, the email message is flagged and the calculated scored is adjusted accordingly. For example, upon a mismatch between country codes, the calculated score may be increased by 1 point.

In addition, an EScam score is calculated. The EScam score is a combination of the Header score and URL score. The EScam score is determined by adding the score for each IP address in the email message and aggregating them based on whether the IP address was from the email header or a URL in the body of the email. The calculation provides a greater level of granularity when determining whether an email is fraudulent.

The EScam score may be compared with a predetermined threshold level to determine if the email message is a phishing email. For example, if the final EScam score exceeds the threshold level, the email message is determined to be a phishing email. In one embodiment, determinations by the EScam server 202 may only use the URL score to calculate the EScam score. If, however, the URL score is over a certain threshold, the Header score can also be factored into the EScam score calculation.

Lastly, at step 128, the EScam server 202 outputs an EScam score, an EScam message and EScam Data to an email recipient including detailed forensic information concerning each IP address associated with the email message. The detailed forensic information may be used to track down the origin of the suspicious email message and allow law enforcement to take action. For example, forensic information gleaned by the EScam server 202 during an analysis of an email message could be the following:

X-eScam-Score: 8

X-eScam-Message: Non-Trusted Country/Hardcoded URL in MAP tag

X-eScam-Data: - - - Begin Header Report - - -

X-eScam-Data: 1: 192.168.1.14 PRIV DHELSPERLAP-
   TOP
X-eScam-Data: 1: Country: * * * Region: * * * City:
   private
X-eScam-Data: 1: Connection Speed: ?
X-eScam-Data: 1: Flags: PRIVATE
X-eScam-Data: 1: Score: 0 [Scanned Clean]
X-eScam-Data: - - - End Header Report - - -
X-eScam-Data: - - - Begin URL Report - - -
X-eScam-Data:   1:   <A>   [167.88.194.136]
   www.wamu.com
X-eScam-Data: 1: Country: usa Region: wa City: seattle
X-eScam-Data: 1: Connection Speed: broadband
X-eScam-Data: 1: Flags:
X-eScam-Data: 1: Score: 0 [URL Clean]
X-eScam-Data: 2: <AREA> [62.141.56.24] 62.141.56.24
X-eScam-Data: 2: Country: deu Region: th City: erfurt
X-eScam-Data: 2: Connection Speed: broadband
X-eScam-Data: 2: Flags: NON-TRUST
X-eScam-Data: 2: Score: 8 [Non-Trusted Country/Hard-
   coded URL in MAP tag]
X-eScam-Data: - - - End URL Report - - -
X-eScam-Data: - - - Begin Process Report - - -
X-eScam-Data: -: Header Score: 0 URL Score: 8
X-eScam-Data: -: Processed in 0.197 sec
X-eScam-Data: - - - End Process Report - - -

Depending on a system configuration, email messages that have been determined to be phishing emails may also be for example, deleted, quarantined or simply flagged for review.

EScam server 202 may utilize domain name server (DNS) lookups to resolve host names in URLs to IP addresses. In addition, when parsing the headers of an email message at step 106, the EScam server 202 may identify the IP address that represents a final email server (email message origination server) in a chain, and the IP address of the sending email client of the email message, if available. The EScam server 202 uses the NetAcuity server 240 (step 110) for the IP address identification. The EScam server 202 may also identify a sending email client.

Figure 2:
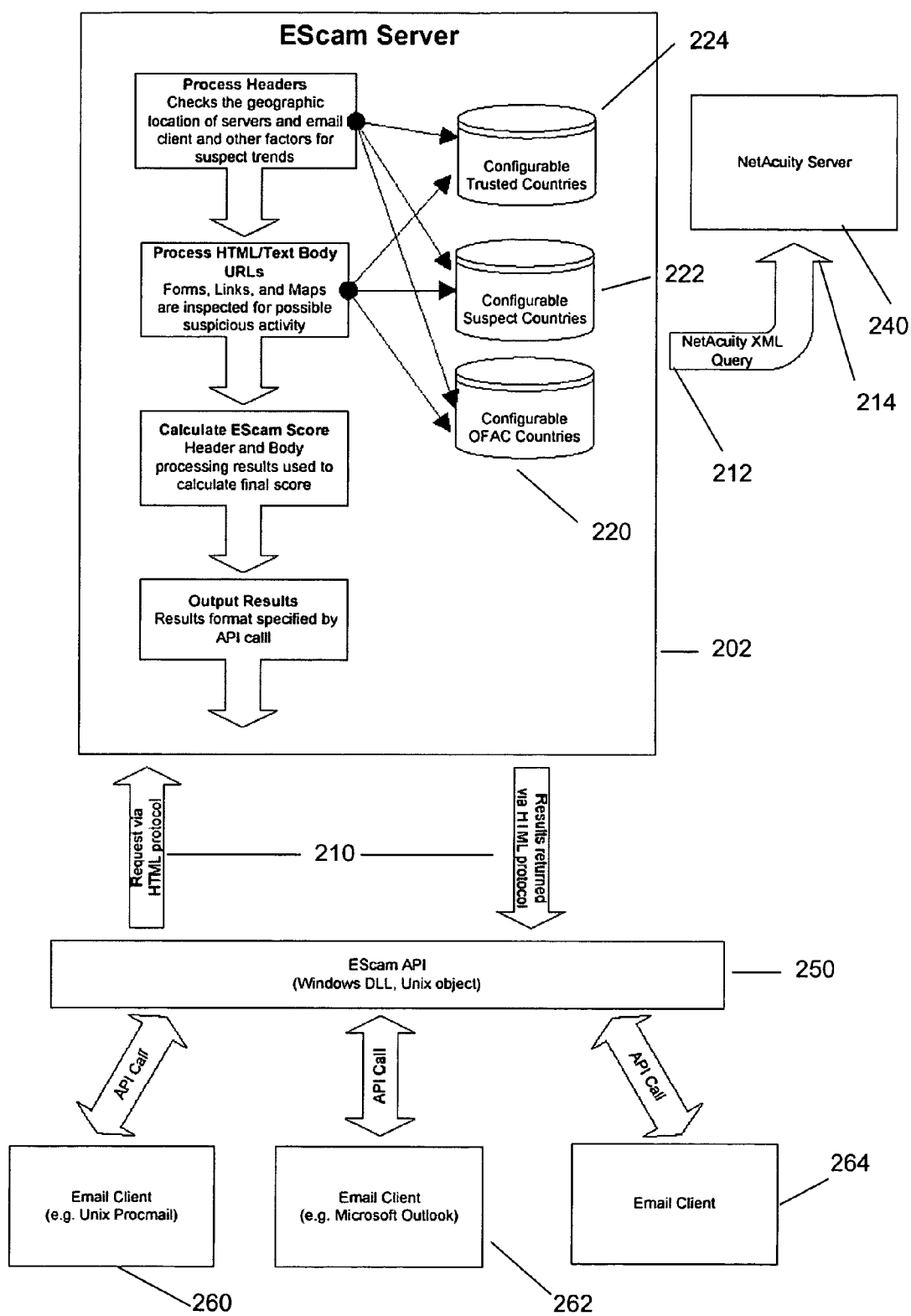
FIG. 2 is a block diagram of a computer system for implementing a first exemplary embodiment of the present invention.

FIG. 2 is an exemplary processing system 200 with which the present invention may be used. System 200 includes a NetAcuity server 240, a Communications Interface 212, a NetAcuity API 214, an EScam server 202, a Communications Interface 210, an EScam API 250 and at least one email client, for example email client 260. Within EScam server 202 resides multiple databases (220, 222 and 224) which store information. For example, database 220 stores a list of OFAC country codes that may be compared with country codes associated with an email message. Database 222 stores a list of suspect country codes that may be compared with country codes associated with the email message. Database 224 stores a list of trusted country codes that may be compared with country codes associated with the email message.

The EScam API 250 provides an interface between the EScam server 202 and third party applications, such as a Microsoft Outlook email client 262 via various function calls from the EScam server 202 and third party applications. The EScam API 250 provides an authentication mechanism and a communications conduit between the EScam server 202 and third party applications using, for example, a TCP/IP protocol. The EScam API 250 performs parsing of the email message body to extract any host names as well as any IP addresses residing within the body of the email message. The EScam API 250 also performs some parsing of the email header to remove information determined to be private, such as a sending or receiving email address.

The EScam API 250 may perform the following interface functions when an email client (260, 262 and 264) attempts to send an email message to EScam server 202:
   Parse an email message into headers and body.
   Process the headers and remove To:, From: and Subject: information from the email message.
   Process the body of the message and retrieve URLs in preparation for sending to the EScam server 202.
   Send the prepared headers and URLs to the EScam Server 202.
   Retrieve a return code from the EScam server 202 once processing by the EScam server 202 is complete.
   Retrieve a textual message resulting from processing conducted by the EScam server 202.
   Retrieve a final EScam score from the EScam server 202 once processing of the email message is complete.
   Retrieve a final EScam Message from the EScam server 202 once processing of the email message is complete.
   Retrieve an EScam Detail from the EScam server 202 when processing of the email message is complete.
   Retrieve the header score.
   Retrieve the URL score.

An additional support component may be included in system 200 which allows a particular email client, for example, email client 260, to send incoming email messages to the EScam server 202 prior to being placed in an email recipient's Inbox (not shown). The component may use the EScam API 250 to communicate with the EScam server 202 using the communications conduit. Based on the EScam score returned by the EScam server 202, the component may, for example, leave the email message in the email recipient's Inbox or move the email message into a quarantine folder. If the email message is moved into the quarantine folder, the email message may have the EScam score and message appended to the subject of the email message and the EScam data added to the email message as an attachment.

Accordingly, the present invention couples IP Intelligence with various attributes in an email message. For example, IP address attributes of the header and URLs in the body are used by the present invention to apply rules for calculating an EScam score which may be used in determining whether the email message is being used in a phishing ploy. Each individual element is scored based on a number of criteria, such as an HTML tag or whether or not an embedded URL has a hard coded IP address. The present invention may be integrated into a desktop (not shown) or on a backend mail server.

In a backend mail server implementation for system 200, the EScam API 250 may be integrated into the email client, for example, email client 260. As the email client 260 receives an email message, the email client 260 will pass the email message to the EScam server 202 for analysis via the EScam API 250 and a Communications Interface 210. Based on the return code, the EScam server 202 determines whether to forward the email message to an email recipient's Inbox or perhaps discard it.

If a desktop integration is utilized, email clients and antivirus vendors may use an EScam server 202 having a Windows based EScam API 250. A desktop client may subsequently request the EScam server 202 to analyze an incoming email message. Upon completion of the analysis by the EScam server 202, an end user may determine how the email message should be treated based on the return code from the EScam server 202; for example, updating the subject of the email message to indicate the analyzed email message is determined to be part of a phishing ploy. The email message may also be moved to a quarantine folder if the score is above a certain threshold.

While the invention has been described in detail in connection with an exemplary embodiment, it should be understood that the invention is not limited to the above-disclosed embodiment. Rather, the invention can be modified to incorporate any number of variations, alternations, substitutions, or equivalent arrangements not heretofore described, but which are commensurate with the spirit and scope of the invention. In particular, the specific embodiments of the Email Anti-Phishing Inspector described should be taken as exemplary and not limiting. Accordingly, the invention is not limited by the foregoing description or drawings, but is only limited by the scope of the appended claims.

We claim:

1. A method of determining a phishing email using a score, comprising:
   receiving an email message;
   parsing the email message into a header and a body;
   extracting a URL from the body;
   determining a HTML tag associated with the URL;
   adjusting the score based on the determined HTML tag;
   determining a geographic location of origination for the email message;
   adjusting the score based on the determined geographic location of origination; and
   determining if the email message is a phishing email message by comparing the score with a predetermined phishing threshold score.

2. The method of claim 1, wherein if the score is above the predetermined phishing threshold score, the email message is concluded to be a phishing email.

3. The method of claim 1, wherein determining if the email message is a phishing email message comprises determining in real time if the email message is a phishing email message by comparing the score with a predetermined phishing threshold score.

4. The method of claim 3, further comprising removing an email address from the email message that is associated with a sender of the email message.

5. The method of claim 3, further comprising removing an email address from the email message that is associated with a receiver of the email message.

6. The method of claim 1, wherein said email message is a HTML email message.

7. The method of claim 1, wherein said email message is a text email message.

8. The method of claim 1, wherein determining if the email message is a phishing email message occurs within a remote server.

9. The method of claim 8, wherein the remote server uses an email scoring algorithm.

10. The method of claim 1, wherein the score is comprised of a header score and a URL score.

11. The method of claim 1, wherein receiving comprises receiving an email message by an email client.

12. The method of claim 11, wherein determining if the email message is a phishing email comprises determining by the email client if the email message is a phishing email message.

13. The method of claim 1, wherein determining if the email message is a phishing email occurs before the email message is sent to an email recipient's Inbox.

14. The method of claim 1, wherein determining a geographic location comprises determining a geographic location of origination for the email message using attributes within the email message.

15. A method of determining a phishing email using a score, comprising:
   receiving an email message comprising a header and a body;
   extracting a URL from the body;
   determining a first IP address associated with the URL;
   determining a markup tag associated with the URL;
   adjusting the score based on the determined markup tag;
   determining if the first IP address is associated with one of a high-risk or OFAC country, and adjusting the score based on the association;
   determining a geographic location of origination for the email message;
   determining a geographic location of a server associated with the email message;
   adjusting the score by comparing the geographic location of origination of the email message and the geographic location of the server, and
   determining if the email message is a phishing email message by comparing the score with a predetermined score.

16. The method of claim 15, wherein determining if the email message is a phishing email message comprises determining in real time if the email message is a phishing email message by comparing the score with a predetermined score.

17. The method of claim 15, further comprising removing an email address from the email message that is associated with a sender of the email message.

18. The method of claim 15, further comprising removing an email address from the email message that is associated with a receiver of the email message.

19. The method of claim 15, wherein the markup tag comprises an HTML markup tag.

20. The method of claim 15, wherein the markup tag comprises an XML markup tag.

21. The method of claim 15, wherein determining if the email message is a phishing email comprises determining by a remote computer if the email message is a phishing email message by comparing the score with a predetermined score.

22. The method of claim 15, wherein receiving comprises receiving an email message comprising a header and a body by an email client.

23. The method of claim 22, wherein determining if the email message is a phishing email comprises determining by the email client if the email message is a phishing email message by comparing the score with a predetermined score.

24. The method of claim 15, wherein determining if the email message is a phishing email comprises determining if the email message is a phishing email message by comparing the score with a predetermined score before the email message is sent to an email recipient's Inbox.

25. A method of determining a phishing email using a score, comprising:
   receiving an email message comprising a header and a body;
   determining a first set of one more IP addresses from the header;
   adjusting the score by performing the following steps for each IP address in the first set of IP addresses:
      determining if the IP address is associated with a trusted country or a non-trusted country;
      determining if the IP address is associated with a proxy server;
      determining if the IP address is associated with a reserved address;
      determining if the IP address is associated with an open relay;

determining if the IP address is a dynamic server IP address; and determining if the email message is a phishing email message by comparing the score with a predetermined score.

26. The method of claim 25, further comprising:

determining a geographic location of origination for the email message;

determining a geographic location of a server associated with the email message; and adjusting the score based on a comparison between the geographic location of origination of the email message and the geographic location of the server.

27. The method of claim 26, further comprising:

extracting a URL from the body;

determining a HTML tag associated with the URL; and adjusting the score based on the determined HTML tag.

28. The method of claim 27, further comprising:

determining a first IP address associated with the URL; and determining if the first IP address is associated with at least one of a high-risk or OFAC country, and adjusting the score based on the association.

29. The method of claim 25, further comprising:

extracting a URL from the body;

determining a HTML tag associated with the URL; and adjusting the score based on the determined HTML tag.

30. The method of claim 25, further comprising:

extracting a URL from the body;

determining a first IP address associated with the URL; and determining if the first IP address is associated with at least one of a high-risk or OFAC country, and adjusting the score based on the association.

31. The method of claim 25, wherein a non-trusted country comprises at least one of a high-risk country or an OFAC country.

* * * * *